Patented Oct. 28, 1947

2,429,660

UNITED STATES PATENT OFFICE 2,429,660

PECTINIZED SUGAR COMPOSITION

Alexander M. Zenzes, New York, N. Y.

No Drawing. Application August 12, 1943,
Serial No. 498,396

20 Claims. (Cl. 99—132)

The present invention relates to the preparation of the pectinized sugar composition containing the entire proper amount of sugar, acid and pectin in such a form that merely by dissolving such composition in water or fruit juice with or without heating a pectin gel is formed.

Numerous mixtures have in the past been made of sugar, acid and pectin and which products consist essentially of mechanical mixtures of these materials. In actual practice, however, such compositions do not form a satisfactory gel or jelly and are unuseable commercially.

It is therefore an object of the present invention to provide a pectinized sugar composition whereby all of the sugar, acid and pectin are present and so that by the simple procedure of adding water with or without flavoring material or fruit pulp or upon the simple procedure of adding fruit juice or a fruit juice concentrate and water, a satisfactory pectin gel is formed, thereby avoiding the complicated several steps that are involved in the normal production of jelly.

A further object is to prepare a jelly base composition whereby the housewife may merely add fruit or fruit juice or water and flavor to this composition in order to form a gel or jelly.

A further object is to provide a dry or plastic pectinized sugar mass in solid brick or bar form containing all of the sugar, acid and pectin required to form a gel or jelly upon the addition of water with or without heat.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the procedures of the present invention it has been found that where a conglomeration of sugar crystals, desirably of relatively small size, is formed and which sugar crystals are surrounded by a highly concentrated jellified film containing sugar, acid and pectin and desirably also other natural or added buffer salts, such a product is in highly stable form and will upon the addition of water form a satisfactory gel or jelly.

The crystallizable sugars contained in such a mass are forced to crystallize out and are surrounded by the jellified film containing the pectin, acid, sugar and desirably also buffer salts which are in completely dissolved condition.

Such a composition can be redissolved in water, desirably in boiling water, fruit juice or other product to form a normal jelly of, for example, 65% to 68% total solids content.

The jellified pectinized film surrounding the crystallized sugar particles will contain from about 65 to 85 parts of sugar to each 100 parts of film. The jellified film will also contain between about 0.75 part to 1.5 parts of pectin and between about 1.25 to 2 parts of tartaric acid, citric acid or its acid equivalent to each 10 parts of water. These proportions are predicated upon the final composition containing 90% total solids and 10% water which is the desired ratio of total solids to water. A satisfactory product may, however, be obtained within the limits of between 80% and 95% total solids and 20% and 5% of water.

The sugar crystals are in substantially compact mass form but are surrounded by the pectinized jellified film containing the full amount of acid and pectin which upon redissolving along with the sugars in crystallized form as well as of those dissolved in the outer film will form the satisfactory gel or jelly.

The sugar utilized in accordance with the procedures of the present invention is first concentrated to at least about 80 Brix and desirably to between 85 and 90 Brix.

There is then prepared a pectin solution using between about 0.75% and 1.5% and preferably 1% of pectin of a standard 100 grade or equivalent against the weight of the sugar, the pectin solution having been made by dissolving about 4% to 5% of pectin in water to form a perfect solution. This pectin solution is then added to the concentrated sugar solution.

Where a sugar of higher purity than about 92 is used or where pure sucrose is used for the production of the pectinized sugar composition of the present invention it is desirable at this point to add a sufficient quantity of buffer salts such as sodium acetate, sodium phosphate or similar salts to retard the setting of the pectin gel until after initiation of crystal formation. Where, however, a sugar composition of 90 purity, for example, is used, the addition of these buffer salts is unnecessary in view of the fact that there are sufficient salts present in the impure sugar solution to retard the gel formation sufficiently to enable the procedures of the present invention to be carried out.

The concentrated sugar solution containing the added pectin solution is then reconcentrated to over 75 Brix and desirably to between 80 and 90 Brix. The sugar-pectin solution is then desirably allowed to cool to between 100° F. and 120° F.

At this point there is added between 1.25% and 1.75% of tartaric acid or citric acid or its acid equivalent against the total weight of sugar, this acid being desirably in the form of a 50% solution.

There is then added to and stirred with this mixture a relatively small quantity, desirably between about 0.05% and 1% of granulated or powdered crystalline sugar.

The composition thus obtained is then poured into molds or containers. The sugar will then crystallize out by allowing the composition preferably to remain at rest although some agitation may be applied in order to force crystallization. The final composition will be found to contain sugar crystals that are surrounded by a concentrated, solubilized, jellified film consisting of sugar, acid, pectin, buffer salts and water in the approximate ratio of 65 to 85 parts of sugar to each 100 parts of film. The jellified film will also contain approximately 1 part of pectin and 1.5 parts tartaric acid, citric acid, or its acid equivalent to each 10 parts of water.

The blocks or bricks thus obtained are non-perishable, stable, solid masses and may be converted into a jelly merely by redissolving in water or fruit juice desirably at an elevated temperature and where desired by concentrating to the desired density of the finished jelly as, for example, by heating to obtain a boiling point of between 219° F. and 220° F.

Where desired, after the dissolved pectin solution has been added to the concentrated sugar mass and after the addition of buffer salts and reconcentration and after the addition of acid, the entire mass may be agitated while cooling whereupon sugar crystals of relatively small size will be formed and which will be surrounded by the concentrated, solubilized, jellified film so that the entire mass may be cast into blocks or poured into containers to form a stable relatively solid or plastic mass.

Where desired, the entire mass, after the addition of the acid may be reconcentrated to between 91% and 93% total solids whereupon the mass may be allowed to cool or agitated while cooling to form the sugar crystals which are surrounded by the concentrated, solubilized, jellified film and which mass at the high concentration and high density of 91% to 93% total solids may be allowed to flow into containers and solidify.

The solidification of the composition of the present invention is greatly facilitated by the inclusion with pure refined cane or beet sugar or pure sucrose of a relatively small amount of the non-sugar impurities of relatively impure sugars. For example, there may be added to such pure refined cane or beet sugars or pure sucrose a relatively small amount of impure sugar solutions or sugars of lower purity or of the non-sugar impurities of low purity sugars or by using any fraction of the non-sugar impurities of relatively impure sugar solutions which comprise a fraction of or all of the ash content of such relatively impure sugar solutions. These various added materials will sufficiently delay the setting time of the gel to permit the sucrose to be crystallized out and to form the desired solidified product of the present invention.

For example, these added materials are of particular importance where pure refined cane or beet sugar or pure sucrose is used as the source for sugar in producing the pectinized sugar of the present invention and whereby the sugar crystals will be enabled to be formed before the gel has been allowed to set.

These various added materials which retard the gel formation for a sufficient period of time to enable the sugar crystals to be formed are in the specification and claims herein referred to as "gel retarding agents."

Where substantially pure refined cane or beet sugar is utilized the outer concentrated, solubilized, jellified film will contain not more than about 10 parts of water to each 20 parts of sugar and about 1 part of pectin and 1.5 parts of tartaric acid or its acid equivalent. The balance of the sugar amounting to about 70 parts will be present in crystalline form surrounded by the pectinized soluble film containing the sugar, pectin, acid and water with added gel retarding agents. These proportions are predicated upon the final composition having 90% total solids.

Where desired, dextrose or other sugars having a solubility lower than sucrose may be substituted for the sucrose in part or in whole.

Where substantially pure sucrose is used the pectinized sugar finally formed will be in substantially solid mass form and although it appears to be a hard stable mass, nevertheless upon addition of water or fruit juice is converted into a finished jelly.

It is also possible to utilize cane or beet sugar compositions and desirably cane sugar compositions containing up to about 10% and desirably between about 2% and 8% of non-crystallizable sugars against the weight of total sugars. For example, there may be utilized raw or partially refined sugar compositions and desirably cane sugars containing between 0.25% and 2.5% total ash and preferably between 0.5% and 1.5% total ash. The ash present is desirably the ash of raw cane sugar including raw cane sugar as crystallized from cane juice as well as the outer syrup film removed by washing of raw sugar crystals as well as the ash of the raw sugar crystals after the outer syrup film has been removed. Desirably these sugars have been subjected to an elevated temperature treatment of between 245° F. and 300° F. for a relatively short period of time varying from a flash treatment to a 15 to 30 minutes treatment, preferably under pressure. For example, there may be utilized raw sugar or blends comprising the outer syrup film removed from raw sugar crystals blended with added sucrose or high sucrose containing compositions so as to provide a sugar syrup of at least 90 purity and then this sugar composition may be utilized in accordance with the procedures of the present invention.

Where such a relatively low purity sugar syrup is used, the ash content of such sugar and the non-sugar impurities contained therein are present in sufficient quantities to retard gel formation for a sufficiently long period of time to enable the individual sugar crystals to be formed before the pectin gel sets and enabling the formation of concentrated solubilized film around the sugar crystals comprising the sugar, pectin, water and acid.

In any event, the amount of non-crystallizable sugars or sugars having a higher solubility than sucrose may not be in excess of 10% of the total sugars having a solubility equal to or lower than the sucrose that may be present.

*Example I*

100 pounds of refined cane sugar is first concentrated to about 85% total solids. 1 pound of 100 grade pectin which has been previously dissolved in water to form a 4% solution is added to the concentrated sugar solution along with a relatively small quantity of buffer salts such as sodium acetate. The pectin sugar solution is then concentrated to between 75 to 85 Brix and preferably to about 80 Brix and permitted to cool to between 100° F. and 120° F.

At this point there is added 3 pounds of a 50% tartaric acid solution. To this mixture there is then added a relatively small quantity of about, for example, ½ pound of finely granulated sugar crystals. The composition is then poured into molds and sugar crystals form which are surrounded by the completely dissolved film consisting of sugar, acid, pectin and buffer salts in water. After crystallization has been completed a plastic mass is obtained which is dry to the touch and which consists of a disperse phase of sugar crystals surrounded by a continuous phase of a concentrated jellified film. The mass or blocks are non-perishable and may be converted into jelly merely by redissolving in boiling water or fruit juice to the desired density.

Example II 100 pounds of raw cane sugar were first prepared as a solution of 85 Brix. This sugar was then heated under pressure to 255° F. for one minute and allowed to cool.

There was then added 1 pound of 100 grade pectin which had previously been dissolved in water to form a 4% pectin solution. The sugar mass was then reconcentrated to 85 Brix and permitted to cool to about 100° F. to 120° F. At this point there was added 3 pounds of a 50% tartaric acid solution. To this combination there was then added ½ pound of finely granulated sugar crystals and the composition was poured into molds and allowed to solidify.

Example III

A sugar syrup was prepared containing 100 pounds of total sugars which included 90% of washed raw sugar and 10% of the outer syrup film removed from raw cane sugar crystals. The sugar solution was concentrated to about 95 Brix and 1 pound of 100 grade pectin previously prepared with a 4% pectin solution in water was added. There was then added 3 pounds of a 50% tartaric acid solution and the entire mass was then reconcentrated to 92 Brix. The mass was then cooled and agitated while cooling to form a heavy but still fluid mass which was allowed to flow into containers and solidify.

Where desired, artificial flavors may also be added to the sugar composition at the time the pectinized sugars are being formed or the pectinized sugars produced in accordance with the procedures of the present invention may be added to boiling water or boiling fruit juice containing added flavor such as artificial fruit and other flavors.

Where the cane sugars are utilized such as those described in Example II and Example III of this application, the finished jellies may merely by the addition of water to the pectinized sugars form highly desirable flavor complexes which may be utilized as jellies without the addition of fruits or other natural flavors or even imitation flavors.

Where it is desired to form a natural fruit jelly or fruit jam, fruit juices or fruit pulp and water may be added to the pectinized sugar of the present invention and merely upon the addition of this pectinized sugar composition to boiling water or fruit juices, the highly desirable jelly products may be obtained.

It has not been found possible to utilize along with the sugars in the preparation of the pectinized sugar of the present invention any fruit juices or invert sugars or non-crystallizable sugars in excess of 10% against the weight of the sucrose or other sugars having a solubility lower than that of sucrose except after the pectinized sugar composition of the present invention has been obtained and the final jelly product is produced.

The concentrated, solubilized, jellified film surrounding the sugar crystals of the final composition, by the procedures of the present invention will have a pH between about 2.5 and 3.8 and desirably between 2.6 and 3.5. Therefore sufficient acid is added to produce this pH in the outer solubilized, concentrated, jellified film.

Less desirably other materials may be utilized in the sugar composition of the present invention to retard gel formation for a sufficiently long period of time to permit the formation of the sugar crystals. For example, there may less preferably be added buffer salts such as sodium acetate and these buffer salts are also included in the term "gel retarding agents," as used in the specification and the claims.

By the term "pectin" as used herein it is understood to mean pectin of definite graded strength as well as pectic acid and the pectins of varying degree of de-methoxylation. There are also included those substances such as the pectic substances which contain a large portion of anhydrogalacturonic acid units, the protopectins, pectinic acid which include the colloidal polygalacturonic acids containing more than a negligible proportion of methyl ester groups, pectin, pectic acid and the salts of pectic acid including either the normal or acid pectates.

To the extent that currently available pectins or pectins of graded strength are utilized and which will provide the jellified film of the present invention within the pH ranges set forth in this specification, namely, between pH 2.5 and 3.8, such pectins may satisfactorily be employed to produce the product of the present invention. Where, however, pectins of different degree of de-methoxylation are employed and which other pectins produce the desired jellified film within wider pH ranges or at lower or higher pH ranges, then these other pectins of other degrees of de-methoxylation may be used. It is then desirable to adjust the pH of the present composition to come within the wider pH range of such other pectins.

Having described my invention, what I claim is:

1. A process of producing a jelly base composition which comprises providing a sugar syrup containing at least about 90% of sugars having a solubility not greater than the solubility of sucrose, said sugar syrup containing between 80% and 95% total solids, adding thereto a completely dissolved pectin solution, said pectin solution containing sufficient pectin to constitute about 0.75% to 1.5% by weight against the weight of total sugar solids, and reconcentrating to at least about 80% total solids, adding an acid in an amount sufficient to produce a pH of between about 2.5 and 3.8 and then adding a relatively small amount of fine sugar particles, said composition being a solid, stable, brick-like material containing all of the sugar, acid and pectin necessary to form a jelly and capable of forming a jelly when only water is added and said composition having a disperse phase of sucrose crystals forming the major part of the solids content and a continuous phase containing a jelly material including the balance of the sugar, the pectin necessary for jellification and the food acid necessary for jellification, said jelly base composition containing between about 80% and 95% total sugar solids.

2. A process of producing a jelly base composition which comprises providing a refined sugar syrup containing between 80% and 95% total solids, adding thereto a relatively small amount of a gel retarding agent, then adding thereto a small amount of a completely dissolved pectin solution, said pectin solution containing sufficient pectin to constitute about 0.75% to 1.5% by weight against the weight of total sugar solids, and reconcentrating to at least about 80% total solids, adding an acid in an amount sufficient to produce a pH of between about 2.5 and 3.8 and then adding a relatively small amount of fine sugar particles, said composition being a solid, stable, brick-like material containing all of the sugar, acid and pectin necessary to form a jelly and capable of forming a jelly when only water is added and said composition having a disperse phase of sucrose crystals forming the major part of the solids content and a continuous phase containing a jelly material including the balance of the sugar, the pectin necessary for jellification and the food acid necessary for jellification, said jelly base composition containing between about 80% and 95% total sugar solids.

3. A process of producing a jelly base composition capable of forming a gel upon the addition of water which comprises providing a sugar syrup of at least about 90 purity containing between 80% and 95% total solids and also containing a sufficient amount of gel retarding agents to permit the sugar crystals to be formed, adding thereto a completely dissolved pectin solution, said pectin solution containing sufficient pectin to constitute about 0.75% to 1.5% by weight against the weight of total sugar solids, reconcentrating to between 80% and 95% total solids and then adding a dissolved acid solution in an amount sufficient to produce a pH of between about 2.5 and 3.8 and then adding a relatively small amount of fine sugar particles, said composition being a solid, stable, brick-like material containing all of the sugar, acid and pectin necessary to form a jelly and capable of forming a jelly when only water is added and said composition having a disperse phase of sucrose crystals forming the major part of the solids content and a continuous phase containing a jelly material including the balance of the sugar, the pectin necessary for jellification and the food acid necessary for jellification, said jelly base composition containing between about 80% and 95% total sugar solids.

4. A process of producing a jelly base composition capable of forming a gel upon the addition of water, which comprises providing a sugar syrup containing between 80% and 95% total solids, and containing also a gel retarding agent, then adding thereto 0.75% to 1.5% of a 100 grade pectin 4% solution, based upon total sugar solids, reconcentrating, adding sufficient acid to produce a pH of between 2.5 and 3.8, and then adding a relatively small amount of fine sugar particles, said composition being a solid, stable, brick-like material containing all of the sugar, acid and pectin necessary to form a jelly and capable of forming a jelly when only water is added and said composition having a disperse phase of sucrose crystals forming the major part of the solids content and a continuous phase containing a jelly material including the balance of the sugar, the pectin necessary for jellification and the food acid necessary for jellification.

5. A process of producing a jelly base composition which comprises providing a cane sugar syrup containing at least 90% total sucrose against the weight of total sugars and said sugar syrup containing between 80% and 95% total solids, adding thereto 0.75% to 1.5% of a 100 grade pectin 4% solution, based upon total sugar solids, adding sufficient acid to produce a pH between 2.5 and 3.8, adjusting the concentration to at least between 80% and 95% total solids, and then adding a small amount of fine crystalline sugar and causing said composition to solidify, said composition being a solid, stable, brick-like material containing all of the sugar, acid and pectin necessary to form a jelly and capable of forming a jelly when only water is added and said composition having a disperse phase of sucrose crystals forming the major part of the solids content and a continuous phase containing a jelly material including the balance of the sugar, the pectin necessary for jellification and the food acid necessary for jellification.

6. A process of producing a jelly base composition capable of forming a gel upon the addition of an aqueous composition which comprises providing a sugar syrup of at least 90 purity and containing over about 80% total sucrose solids, adding thereto a small amount of completely dissolved pectin and acid, said pectin constituting between about 0.75% and 1.5% by weight against the weight of total sugar solids and said acid being added in a sufficient amount to produce a pH of between about 2.5 and 3.8, reconcentrating to over 90% total solids, allowing to cool with agitation whereby the composition solidifies, said composition being a solid, stable, brick-like material containing all of the sugar, acid and pectin necessary to form a jelly and capable of forming a jelly when only water is added and said composition having a disperse phase of sucrose crystals forming the major part of the solids content and a continuous phase containing a jelly material including the balance of the sugar, the pectin necessary for jellification and the food acid necessary for jellification.

7. A jelly base composition comprising a discontinuous phase of about 65% to 85% sugar crystals surrounded by a concentrated solubilized jellified film comprising between about 0.75% and 1.5% pectin against the weight of total sugar solids in the jelly base composition, acid and sugar, said composition in said jellified film containing all of the pectin and all of the acid necessary to form a complete jelly and in the entire composition containing such proportion of sugar as will form a complete jelly with the pectin, only the addition of water being required to form such complete jelly, said jelly base composition having a pH of between about 2.5 and 3.8 and containing between about 80% and 95% total sugar solids.

8. A jelly base composition comprising a discontinuous phase of about 65% to 85% sugar crystals surrounded by a concentrated solubilized, jellified film comprising between about 0.75% and 1.5% pectin against the weight of total sugar solids in the jelly base composition, acid, sugar and a gel retarding agent, said composition in said jellified film containing all of the pectin and all of the acid necessary to form a complete jelly and in the entire composition containing such proportion of sugar as will form a complete jelly with the pectin, only the addition of water being required to form such complete jelly, said jelly base composition having a pH of between about 2.5 and 3.8 and containing between about 80% and 95% total sugar solids.

9. A jelly base composition comprising a discontinuous phase of about 65% to 85% sugar crystals surrounded by a concentrated solubilized jellified film comprising between about 0.75% and 1.5% pectin against the weight of total sugar solids in the jelly base composition, acid and non-crystallizable, relatively impure sugars, said composition in said jellified film containing all of the pectin and all of the acid necessary to form a complete jelly and in the entire composition containing such proportion of sugar as will form a complete jelly with the pectin, only the addition of water being required to form such complete jelly, said jelly base composition having a pH of between about 2.5 and 3.8 and containing between about 80% and 95% total sugar solids.

10. A jelly base composition capable of forming a jelly upon the addition of water, said composition comprising a discontinuous phase of about 65% to 85% sucrose crystals surrounded by a concentrated, solubilized, jellified film comprising between about 0.75% and 1.5% pectin against the weight of total sugar solids in the jelly base composition, acid and sugar, said film having a pH between 2.5 and 3.8, said composition in said jellified film containing all of the pectin and all of the acid necessary to form a complete jelly and in the entire composition containing such proportion of sugar as will form a complete jelly with the pectin, only the addition of water being required to form such complete jelly, and said jelly base composition containing between about 80% and 95% total sugar solids.

11. A jelly base composition capable of forming a jelly upon the addition of water, said composition comprising a discontinuous phase of about 65% to 85% sucrose crystals surrounded by a concentrated, solubilized, jellified film comprising between about 0.75% and 1.5% pectin against the weight of total sugar solids in the jelly base composition, acid, sugar and a gel retarding agent, said composition having a pH between 2.5 and 3.8, said composition in said jellified film containing all of the pectin and all of the acid necessary to form a complete jelly and in the entire composition containing such proportion of sugar as will form a complete jelly with the pectin, only the addition of water being required to form such complete jelly, and said jelly base composition containing between about 80% and 95% total sugar solids.

12. A jelly base composition comprising a discontinuous phase of sugar crystals surrounded by a solubilized, jellified film comprising 65 to 85 parts of sugar to each 100 parts of jellified film, from 0.75 part to 1.5 parts of pectin to each 10 parts of water, said composition having a pH of between 2.5 and 3.8, said composition in said jellified film containing all of the pectin and all of the acid necessary to form a complete jelly and in the entire composition containing such proportion of sugar as will form a complete jelly with the pectin, only the addition of water being required to form such complete jelly.

13. A process of forming a jelly base composition containing about 65% to 85% crystallized sucrose in a disperse phase, and pectin, acid and additional sugar and water in a continuous phase encircling and embodying said disperse phase, said disperse phase and continuous phase forming a solid, non-plastic, non-liquid, brick-like composition which upon the addition of water only will form a complete satisfactory jelly, said process comprising forming a sucrose syrup solution of about 80 to 90 Brix, adding sufficient pectin in an amount of about 0.75% to 1.5% against the weight of the sucrose thereto to jellify the sugar, adding sufficient food acid to produce a pH of between about 2.5 and 3.8 to cause jellification of the sugar with the pectin and causing the sugar to crystallize out and form a disperse phase while embodied in a continuous phase of a jellified film, said jelly base composition containing between about 80% and 95% total sugar solids.

14. A process comprising concentrating a sugar syrup to about 80 to 90 Brix, adding 0.75% to 1.5% of a 4% to 5% hundred grade pectin solution as against the weight of the sugar, reconcentrating to 75 to 90 Brix, cooling to 100° F. to 120° F., adding 1.25 to 2.00 parts of food acid for each 10 parts of water, said food acid being in a 50% solution, adding 0.05% to 1.0% of finely divided crystalline sucrose, pouring into molds with agitation to produce a solid, stable, brick-like composition.

15. A process of forming a sugar composition which upon the addition of water alone will form a jelly, which comprises dissolving 100 parts by weight of refined cane sugar to form a solution of 85% solids, adding 1 part by weight of hundred grade pectin in the form of a 4% solution, concentrating the pectin sugar solution to between 75 to 85 Brix, cooling to between 100° F. and 120° F., adding 3 pounds of a 50% tartaric acid solution, adding ½ pound of finely granulated sugar crystals and pouring the composition into molds to form a plastic mass which is dry to the touch and capable of forming a jelly upon the addition of water only.

16. A process of forming a jelly base composition which comprises forming a raw cane sugar solution having 100 parts by weight of a concentration of 85 Brix, heating the solution under pressure to 255° F. for 1 minute, cooling, adding 1 part by weight of hundred grade pectin in the form of a 4% pectin solution, reconcentrating to 85 Brix, cooling to about 100° F. to 120° F., adding 3 parts by weight of a 50% tartaric acid solution, adding ½ pound of finely granulated sugar crystals and pouring the composition into molds to solidify whereby a solid composition dry to the touch is obtained.

17. A process of producing a jelly base composition which comprises preparing a sugar syrup with 100 parts by weight of sugar including 90% of washed raw sugar and 10% of the washings of raw cane sugar crystals, said solution having a concentration of 95 Brix, adding 1 part by weight of hundred grade pectin in the form of a 4% aqueous pectin solution, adding 3 pounds of a 50% tartaric acid solution, reconcentrating the entire mass to 92 Brix, cooling and agitating to form a solidified mass which when set will be dry to the touch.

18. A sugar base composition comprising a disperse phase consisting of sucrose crystals forming 70% by weight of the composition and a continuous phase composed of a film containing approximately 1% pectin, 1.5% tartaric acid, 19% sugar and 8.5% of water, the total solids in the composition being 91.5%.

19. A solid sugar composition comprising 80% to 95% of solids and 60% to 80% of sucrose crystals forming a disperse phase, said disperse phase being embodied in a continuous, homogeneous film containing 65 to 85 parts of sugar per 100 parts of the film and 0.75 to 1.5 parts of pectin and 1.25 to 2 parts of tartaric acid for each 10 parts of the water in the film.

20. A process comprising concentrating a sugar syrup to about 80 to 90 Brix, adding 0.75% to 1.5% of a 4% to 5% hundred grade pectin solution as against the weight of the sugar, concentrating to 75 to 90 Brix, cooling to 100° F. to 120° F., adding a small amount of a water soluble alkali metal salt to retard setting, and adding 1.25 to 2.00 parts of food acid for each 10 parts of water, said food acid being in a 50% solution, adding 0.05% to 1.0% of finely divided crystalline sucrose, pouring into molds with agitation to produce a solid, stable, brick-like composition.

ALEXANDER M. ZENZES.

REFERENCES CITED

The following references are of record in the file of this patent:

UNITED STATES PATENTS

| Number | Name | Date |
|---|---|---|
| 2,054,873 | Whitby | Sept. 22, 1936 |
| 2,261,919 | Pittman et al. | Nov. 4, 1941 |
| 1,532,271 | Slay | Apr. 7, 1925 |
| 2,098,604 | Whymper | Nov. 9, 1937 |
| 2,046,567 | Lund | July 7, 1936 |
| 2,041,197 | Lund | May 19, 1936 |
| 2,059,541 | Thompson | Nov. 3, 1936 |
| 1,949,657 | Preston | Mar. 6, 1934 |
| 2,076,036 | Leo | Apr. 6, 1937 |

FOREIGN PATENTS

| Number | Country | Date |
|---|---|---|
| 308,850 | Germany | 1917 |
| 17,557 | Great Britain | 1890 |
| 16,540 | Great Britain | 1889 |